(12) United States Patent
Binderberger

(10) Patent No.: US 7,333,881 B2
(45) Date of Patent: Feb. 19, 2008

(54) DEVICE FOR DISPLAYING MAINTENANCE PROCEDURE REQUIREMENTS

(75) Inventor: Andreas Binderberger, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 11/082,660

(22) Filed: Mar. 18, 2005

(65) Prior Publication Data

US 2005/0216150 A1 Sep. 29, 2005

Related U.S. Application Data

(63) Continuation of application No. PCT/EP03/07565, filed on Jul. 12, 2003.

(30) Foreign Application Priority Data

Sep. 20, 2002 (DE) ................................ 102 44 297

(51) Int. Cl.
*G06F 19/00* (2006.01)

(52) U.S. Cl. ........................ 701/30; 701/29; 340/425.5; 340/457; 340/457.4; 702/184

(58) Field of Classification Search .................. 701/30, 701/29; 702/184; 340/425.5, 457, 457.4
See application file for complete search history.

(56) References Cited

U.S. PATENT DOCUMENTS

| 4,525,782 | A | | 6/1985 | Wohlfarth et al. | |
|---|---|---|---|---|---|
| 5,006,829 | A | | 4/1991 | Miyamoto et al. | |
| 5,931,878 | A | * | 8/1999 | Chapin, Jr. | 701/30 |
| 6,141,629 | A | * | 10/2000 | Yamamoto et al. | 702/187 |
| 6,308,120 | B1 | * | 10/2001 | Good | 701/29 |
| 2002/0080022 | A1 | * | 6/2002 | Edwards | 340/457 |
| 2004/0093134 | A1 | * | 5/2004 | Barber et al. | 701/29 |
| 2004/0249532 | A1 | * | 12/2004 | Kelly et al. | 701/30 |
| 2005/0080525 | A1 | * | 4/2005 | Hoeflacher et al. | 701/29 |

FOREIGN PATENT DOCUMENTS

| DE | 31 10774 C2 | 10/1982 |
|---|---|---|
| DE | 200 15 856 U1 | 12/2000 |
| DE | 199 41 962 C2 | 3/2001 |
| DE | 201 03 279 U1 | 7/2001 |
| DE | 101 29 457 C1 | 12/2002 |
| WO | WO 02/102627 A1 | 12/2002 |

* cited by examiner

*Primary Examiner*—Thomas Black
*Assistant Examiner*—Marie A Weiskopf
(74) *Attorney, Agent, or Firm*—Crowell & Moring LLP

(57) ABSTRACT

In a device for displaying maintenance procedures for motor vehicles with a display that has surface sections separate from one another on which information on the type of procedure and information on the due date of the procedure is displayed for each maintenance procedure, the information on the procedure is formed as a time line diagram. The due date is represented as a marking on the particular time line at a distance from a reference point common to the maintenance procedures corresponding to the length of time to the due date.

20 Claims, 1 Drawing Sheet

① Odometer reading of vehicle
② Date of Description (based on on-board date)
③ Kilometers Remaining
④ Target Date
⑤ Distance (time) interval prognosis
⑥ Personal yearly mileage

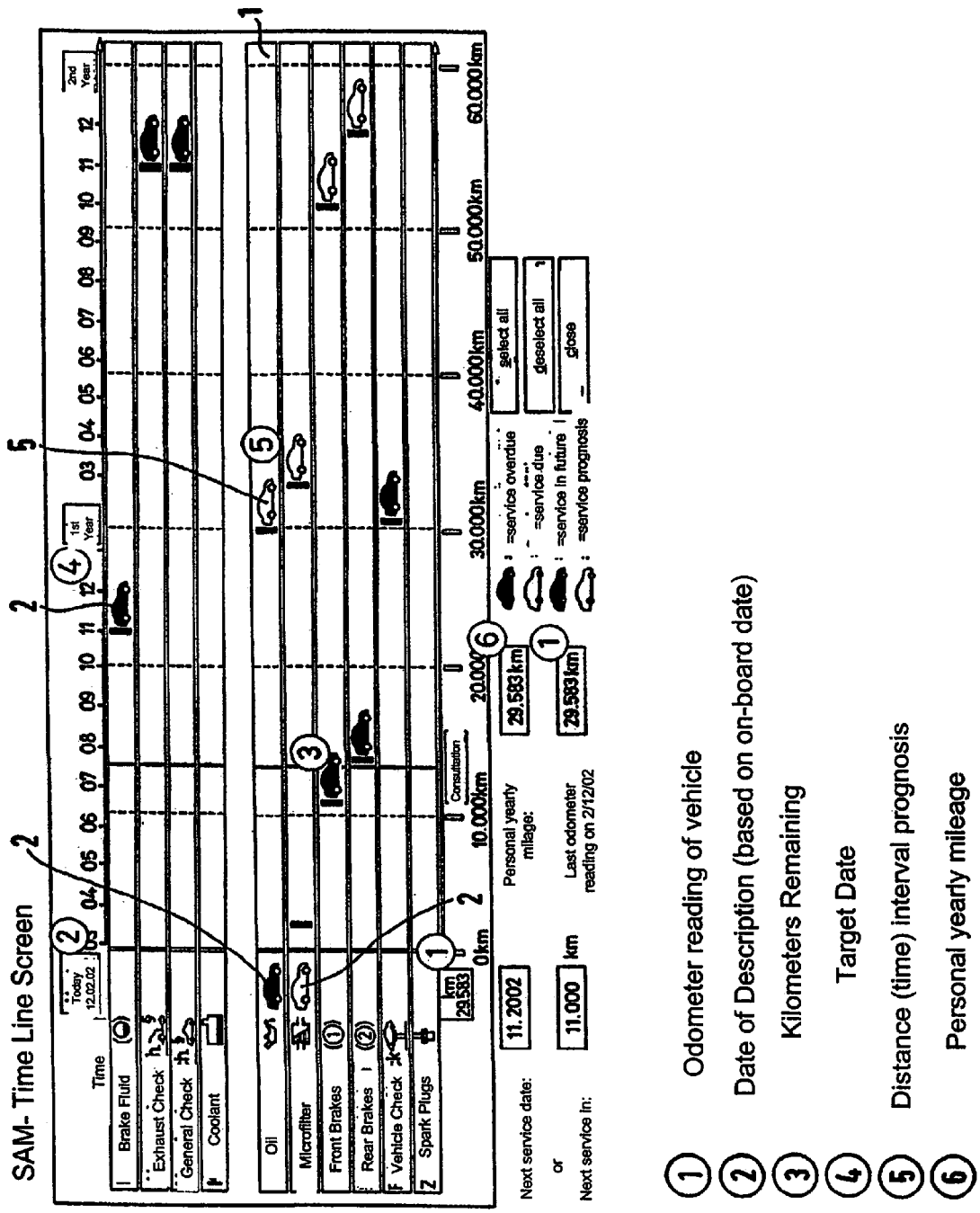

DEVICE FOR DISPLAYING MAINTENANCE PROCEDURE REQUIREMENTS

The present invention is a continuation of International Application No. PCT/EP03/07565, filed Jul. 12, 2003, and claims priority under 35 U.S.C. § 119 to German Application No. 102 44 297.5, filed Sep. 20, 2002, the entire disclosure of these documents is herein expressly incorporated by reference.

BACKGROUND AND SUMMARY OF THE INVENTION

The invention relates to a device for displaying scheduled maintenance requirements for motor vehicles.

This kind of device is known from German Patent Document No. DE 201 03 279 U1. The maintenance schedule is presented as a multiposition digital date or odometer reading display. The maintenance schedule depends partly on distance driven and partly on time elapsed. The schedules for different maintenance procedures are placed above or below one another but due, for example, to a different type of scheduling (time or distance dependent), there is considerable confusion in the display.

Time-dependent maintenance procedures include changing brake fluid (e.g., every two years) and distance-dependent procedures include replacing parts subject to wear, typically brake linings. There are also maintenance procedures which depend on both distance driven and time elapsed. For example, it is recommended that engine oil be changed after a given period of time even though the predetermined mileage has not yet been reached. This is the case with vehicles with low mileage.

The present invention is directed to creating a device for displaying scheduled maintenance requirements for motor vehicles in which different maintenance procedures can be displayed in a non-confusing manner.

The invention fulfills this task with a display that has surface sections separate from one another on which information regarding the type of the procedure and information regarding the due date of the procedure is displayed for each maintenance procedure, wherein the information regarding the procedure is formed as a time line diagram and the due date is represented as a marking on the particular time line at a distance from a reference point common to the maintenance procedures corresponding to the length of time to the due date.

The present invention assigns a time line diagram to each maintenance procedure.

The due date of a time-dependent maintenance procedure can be identified by the marking on the particular time line. If the maintenance procedure is due, the distance from the common maintenance procedure reference point is minimal, preferably equal to zero. The reference point is the same as the current date in each case. If the due date is coming up soon, the distance is small. The larger the distance, the due date for the scheduled maintenance procedure is farther in the future.

The due date of a distance-dependent maintenance procedure can also be identified by the marking on an assigned time line. For this purpose, the particular distance driven is connected with the particular time driven on the basis of the total annual driving distance. A maintenance procedure which, for example, can be expected after 15,000 kilometers can be expected in 6 months when the total annual driving distance is 30,000 kilometers. For new vehicles this is derived from extrapolation of the distance driven to date.

In maintenance procedures which, like changing engine oil, are time- or distance-dependent, the due date is based on the "worst case" principle. The due date depends on the parameter (distance or time) which reaches its limit (e.g., 30,000 kilometers or 6 months) first.

Overall this makes it possible to show on the display maintenance procedures which come due based on elapsed time and/or distance driven.

One particular advantage of the present invention is that several due dates can also be represented for one maintenance procedure. In addition to a currently upcoming due date, a future due date can also be shown on the time line at a correspondingly large distance. Thus maintenance procedures which can be expected in the future can also be represented on the time line diagram at the correct time. Correct time means that the due date point can be read exactly on the time line for the particular maintenance procedure.

Overall, this also provides an overview of the maintenance status of the vehicle. If there are no maintenance procedures upcoming in the near future, this is made clear by the markings which are at a clear distance from the reference point.

Other advantageous forms of the invention include the possibility of being able to voluntarily change the display of the time for a maintenance procedure by displacing the particular marking.

It is also possible to display the predictable costs of the maintenance procedures to be performed and/or the availability of the replacement parts required for the maintenance procedure. Finally, it is also possible to vary the color representation of the markings assigned to the particular maintenance procedures according to their urgency.

For the technical implementation of each of these described procedures, the display and the assigned input element are connected to a data storage which contains the replacement parts that may be required for each procedure, the stock of these replacement parts and their purchase price. The data in the data storage are automatically read out with the selection of the maintenance procedure and reproduced in a more readable form on the display.

BRIEF DESCRIPTION OF THE DRAWINGS

The sole FIGURE illustrates a display on which different maintenance procedures are individually and clearly represented, and there is also an overview of all maintenance procedures.

DETAILED DESCRIPTION OF THE DRAWINGS

On display 1, a number of maintenance procedures which come due based on length of time are individually entered as markings 2 under an assigned time line 3 divided into one-month sections. The display is available in a vehicle service center or in the vehicle itself.

The available or resulting basic information on the particular vehicle is designated u-z.

These maintenance procedures involve (changing) the brake fluid, examining the exhaust, general inspection and, if necessary, changing the coolant. The time line ranges from the current date identified as "today" (here taken as Feb. 12, 2002) to a date exactly two years later (thus Feb. 12, 2004). Markings made, such as, for example, the brake fluid at 11 (months), indicate visually that this maintenance procedure must be expected after 11 months, i.e., about the middle of 2003 in this case.

The due date for each of these procedures comes from the information available for the particular vehicle and contained, for example, in a data storage in the vehicle key and read out in the vehicle service center. There is also information which is provided by the manufacturer for this particular model of vehicle (e.g., for this model changing the brake fluid every 24 months connected with the individual vehicle information on the last such brake fluid change 13 months ago). The lack of a marking for "coolant" means that no changing is required in the next 24 months.

The due date for maintenance procedures depending on distance driven is visually contrasted and displayed as a function of operating time, which is derived from the total annual driving distance. The total annual driving distance in the first year of operation is determined from extrapolation of the distance driven up to the particular point in time. In the case at hand, the vehicle has a total annual distance driven of about 30,000 kilometers.

These adaptive maintenance procedures, i.e., procedures dependent on the individual behavior of the driver, involve changing (engine) oil, microfilters, front and rear brake linings ("brakes front" and "brakes rear"), spark plugs and a general inspection of the vehicle.

The maintenance procedures due, in this case changing the engine oil and the microfilter, are displayed by arranging the pertinent markings (time) behind that of the current date. Future scheduled maintenance due (engine oil after 30,000 kilometers, microfilter after 32,000 kilometers) is also displayed. The urgency of each item of scheduled maintenance can be signaled by coloring the markings differently.

Because this involves a vehicle with high-mileage use, the display of the maintenance procedure "engine oil" is in the block of the distance-dependent maintenance procedures. 30,000 kilometers of operation is the distance determining the next oil change and will predictably be covered in 12 months.

If this involved a vehicle with low-mileage use (under 15,000 kilometers a year), the scheduled time for the next oil change would be determined by the manufacturer's requirement for changing the oil after no more than 24 months. The maintenance procedure "oil" would then also be represented in the upper block of time-dependent maintenance.

By taking into account the total annual distance driven, i.e., the predictable or actual distance covered in one year, maintenance procedures with differently derived due dates (operating distance or operating time) can be compared.

It is also possible to identify the upcoming maintenance procedures, e.g., "front brakes" and to take them into account in the extent of maintenance to be performed in each case. For this purpose, the particular marking can be dragged into the section defined by "Today" by means of the usual "drag and draw" method. A maintenance order to be made out at that point then contains the items "oil", "microfilter" and "front brakes".

Advantageous forms of the invention, which are not represented in detail, make it possible to predict further future maintenance procedures exactly. On the basis of the information on the driving style of the particular driver, it can be precisely predicted when the next maintenance procedures are due.

Driving style is derived, for example, from the distance driven between two successive brake lining changes, e.g., the front brake linings. If this distance is shorter than a distance averaged over several drivers, this involves an aggressive driver whose next brake lining change can be expected to be much earlier (i.e., after a shorter distance driven).

Accordingly it is also possible to assess maintenance costs. The costs of maintenance are taken from a pertinent databank (not shown) and reproduced in display 1 at a suitable location (not shown).

Finally, the scale for the time line diagram can also be individually configured. For an infrequent driver it is sufficient to represent only a period of 12 months; for a frequent driver on the other hand it may be wise to visualize more than the maintenance procedures scheduled for the next 24 months.

In this way it becomes possible to obtain quickly and reliably an overview of the maintenance status, the upcoming maintenance scheduled to be performed and the costs of maintenance.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A device for displaying maintenance procedures for motor vehicles with a display that has surface sections separate from one another on which information regarding the type of the procedure and information regarding the due date of the procedure is displayed for each maintenance procedure, wherein the information regarding the procedure is formed as a time line diagram and the due date is represented as a marking on the particular time line at a distance from a reference point common to the maintenance procedures corresponding to the length of time to the due date, wherein the reference point is a current date, and wherein a scale of the time line diagram is adjusted based on driving frequency.

2. The device according to claim 1, wherein maintenance procedures are represented on the display with due dates determined by operating time and/or operating distance.

3. The device according to claim 2, wherein the due dates for maintenance procedures which come due depending on operating distance are represented as a function of an operating time derived from the total annual distance driven.

4. The device according to claim 3, wherein the total annual distance driven is determined in the first year of operation from an extrapolation of the distance driven up to the particular point in time of determination.

5. The device according to claim 1, wherein maintenance procedures which are to be expected in the future are also represented on the time line diagram at the correct time.

6. The device according to claim 1, wherein the display of the point in time of a maintenance procedure can be changed by moving a pertinent marking.

7. The device according to claim 1, wherein displays of predictable costs of the particular maintenance procedure are also linked with the maintenance procedures.

8. The device according to claim 1, wherein the color representation of the markings assigned to the particular maintenance procedures differs depending on their urgency.

9. The device according to claim 1, wherein more than one due date is represented on the display for at least one of the maintenance procedures.

10. A method for displaying a plurality of maintenance procedures for a motor vehicle, the method comprising the acts of:

forming information regarding a procedure type and due date of each of the plurality of maintenance procedures as a time line; and representing on a display the due date of each of the plurality of maintenance procedures as a marking on the time line at a distance from a reference point common to each of the plurality of maintenance procedures, wherein the distance from the reference point corresponds to a length of time to the due date of each of the plurality of maintenance procedures, wherein the reference point is a current date, and wherein the plurality of maintenance procedures include a first group of maintenance procedures with due dates determined based on actual operation of the motor vehicle, and a second group of maintenance procedures with due dates determined independent of the actual operation of the motor vehicle, and the first and second groups of maintenance procedures are displayed on different portions of the display.

11. The method of claim 10, wherein the plurality of maintenance procedures are represented with due dates determined by operating time and/or operating distance.

12. The method of claim 11, wherein the due dates for the plurality of maintenance procedures which come due depending on operating distance are represented as a function of an operating time derived from the total annual distance driven.

13. The method of claim 12, further comprising the act of: determining the total annual distance driven in a first year of operation from an extrapolation of the distance driven up to a particular point in time of determination.

14. The method of claim 10, wherein the display of the point in time of a maintenance procedure can be changed by moving a pertinent marking.

15. The method of claim 10, wherein displays of predictable costs of each of the plurality of maintenance procedure are also linked with the plurality of maintenance procedures.

16. The method of claim 10, wherein the color representation of the markings assigned to each of the plurality of maintenance procedures differs depending on their urgency.

17. The method of claim 10, wherein more than one due date is represented on the display for at least one of the plurality of maintenance procedures.

18. The method of claim 10, wherein a scale of the time line diagram is adjusted based on driving frequency.

19. The method of claim 10, wherein when actual operation of the motor vehicle is less than a predetermined amount, at least one of the maintenance procedures of the first group is displayed with the maintenance procedures of the second group.

20. A method for displaying a plurality of maintenance procedures for a motor vehicle, the method comprising the acts of:

forming information regarding a procedure type and due date of each of the plurality of maintenance procedures as a time line; and representing on a display the due date of each of the plurality of maintenance procedures as a marking on the time line at a distance from a reference point common to each of the plurality of maintenance procedures, wherein the distance from the reference point corresponds to a length of time to the due date of each of the plurality of maintenance procedures, wherein at least one of the maintenance procedures includes a first marking for a first due date and a second marking for a second due date, and the first and second markings are represented in a different visual manner, and wherein the reference point is a current date.

* * * * *